United States Patent [19]

Tokarz

[11] 4,388,267

[45] Jun. 14, 1983

[54] TEMPERATURE PROFILE DETECTOR

[75] Inventor: Richard D. Tokarz, West Richland, Wash.

[73] Assignee: The United States of America as represented by the United States Department of Energy, Washington, D.C.

[21] Appl. No.: 229,496

[22] Filed: Jan. 29, 1981

[51] Int. Cl.³ .................... G01K 11/06; G21C 17/00
[52] U.S. Cl. ................... 376/247; 324/65 R; 340/590; 374/106
[58] Field of Search ........... 376/245, 247; 73/358, 73/362 AR; 116/216, 217, 218, 220; 340/590, 340/591, 593; 324/65 R, 65 P; 374/106, 110, 137, 374/160

[56] References Cited

U.S. PATENT DOCUMENTS

| | | | |
|---|---|---|---|
| 2,518,789 | 8/1950 | Jackson | 340/590 |
| 3,046,536 | 7/1962 | Sciuto | 340/590 |
| 3,527,098 | 9/1970 | Salgado | 73/358 |

Primary Examiner—Richard A. Farley

[57] ABSTRACT

Temperature profiles at elevated temperature conditions are monitored by use of an elongated device having two conductors spaced by the minimum distance required to normally maintain an open circuit between them. The melting point of one conductor is selected at the elevated temperature being detected, while the melting point of the other is higher. As the preselected temperature is reached, liquid metal will flow between the conductors, creating short circuits which are detectable as to location.

5 Claims, 4 Drawing Figures

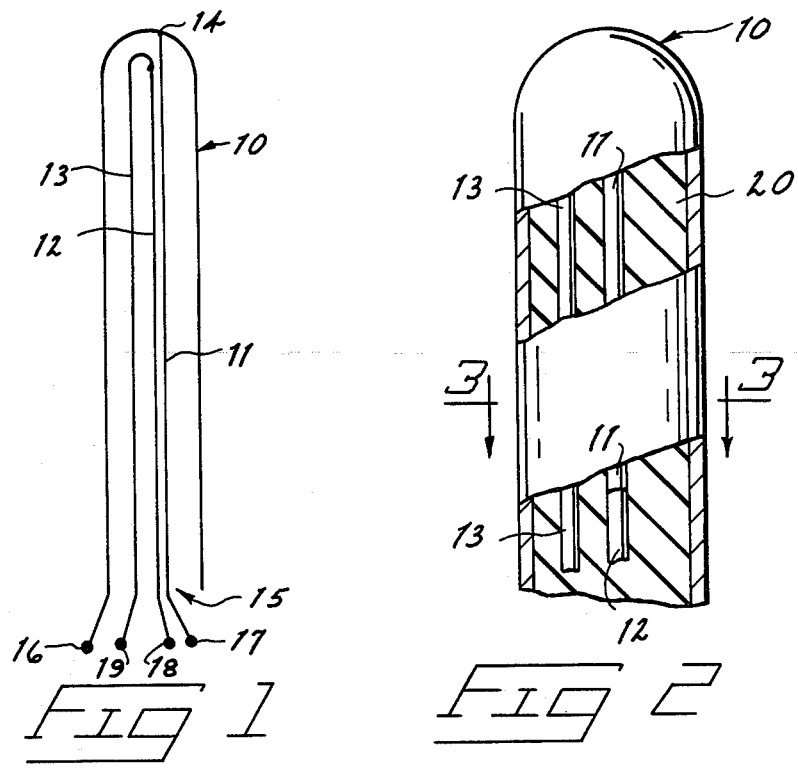
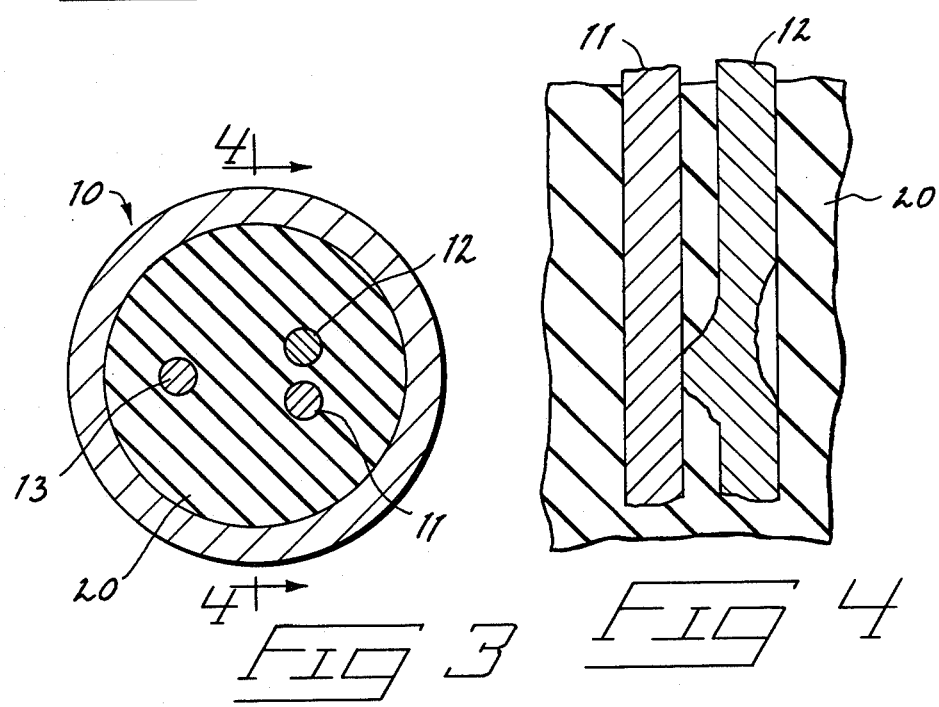

TEMPERATURE PROFILE DETECTOR

The United States government has rights in this invention pursuant to contract No. EY-76-C-06-1830 between the U.S. Department of Energy and Battelle Memorial Institute.

BACKGROUND OF THE DISCLOSURE

This disclosure relates to a temperature detector for determining the physical profile of temperature rises to a predetermined temperature. It is capable of providing a physical profile of temperature rises spreading through an adjacent heated element.

This invention arose from tests requiring measurement of selected operational parameters within nuclear fuel bundles. It meets projected fuel bundle instrumentation requirements for development of peak temperature profiles along the length of a fuel bundle. This is desirable in the design, testing and use of fuel bundles in order to provide a temperature profile at temperatures approaching that at which fuel rod meltdown would occur. There is no direct contact method to measure temperatures this high.

The present device allows the profiling of any one temperature excursion within the monitored system, such as a reactor core, and further provides a growth profile. It requires that only three leads and a metal shield be brought from the core itself for monitoring purposes during measurement usage.

SUMMARY OF THE INVENTION

The temperature profile detector essentially comprises a pair of electrical conductors spaced apart normally by the minimum distance necessary to maintain an open circuit between them across a separating section of insulating material. One conductor is made of material having a preselected melting point. The other is made of material whose melting point is appreciably higher. As the preselected melting point temperature occurs along the length of the conductors, the one conductor will melt and bridge the space between the two conductors. The resulting differences in electrical resistance along the lengths of the conductors as this shorting occurs can be monitored to produce signals indicative of the location at which melting of the one conductor has occurred.

It is an object of this invention to provide a relatively inexpensive device capable of developing accurate temperature profiles at very high temperatures and under hostile environmental conditions such as those found within nuclear reactors.

Another object of this invention is to provide a fully enclosed detector having no moving parts.

Another object of this invention is to provide a relatively simple detector apparatus which can be readily replaced after being used.

DESCRIPTION OF THE DRAWINGS

FIG. 1 is a schematic view illustrating the present device;

FIG. 2 is a fragmentary view of the device with portions of it broken away to illustrate its inner structure;

FIG. 3 is an enlarged transverse sectional view taken along line 3—3 in FIG. 2;

FIG. 4 is a sectional view taken along line 4—4 in FIG. 3, illustrating operation of the device.

DESCRIPTION OF THE PREFERRED EMBODIMENT

The present device is designed to provide temperature profiling at a preselected temperature along an elongated monitored member or element, such as a nuclear fuel rod. It can be used in testing or in operational monitoring of fuel bundles to identify the location along a fuel bundle where preselected elevated temperatures first occur, as well as a growth profile indicating the manner by which such a temperature spreads along the length of the fuel bundle. Such a meltdown profile is a valuable asset to fuel bundle design, but has not previously been practically available.

The sensor is shown in the form of a metallic oxide metal sheath cable with three conductors. It is illustrated schematically in FIG. 1 and in greater detail in FIGS. 2 and 3. Its operation is illustrated in FIG. 4.

Basically, the device comprises two electrical conductors spaced from one another by the minimum distance necessary to normally maintain an open circuit between them. The temperature at which this circuit is modified by shorting across the conductors is governed by the melting point of the material comprising one of the conductors. When this preselected melting point temperature occurs along the lengths of the conductors, melting will result at the heated location. Molten metal will then flow between the two conductors. This will short or bridge the gap between the conductors. By measuring the resistance of the remaining lengths of the conductors, one can derive electrical signals indicating the location at which the short has occurred.

As shown in the drawings, the first elongated electrical conductor is a length of wire having a melting point at the preselected temperature being monitored. It is shown as the active leg 12 in a loop of wire also including a parallel return leg 13 having a higher melting point. The second elongated electrical conductor is parallel to the first conductor 12 and spaced from it by the minimum distance required to normally maintain an open circuit between them. It is shown as a length of wire 11 electrically coupled to the closed end 14 of a surrounding length of metal sheathing 10. The length of wire 11 and the open ends of the loop of wire extend outwardly from the second end 15 of the metal sheathing 10. External terminals 16 through 19 are formed at the outer ends of the sheathing 10, length of wire 11, active leg 12 and return leg 13, respectively.

The metal sheathing 10, the length of wire 11 and the return leg 13 of the single wire loop are each made of material having melting temperatures substantially higher than the melting temperature of the active leg 12 of the wire loop. The remaining space at the interior of sheathing 10 is filled by metallic oxide, which is an effective electrical insulator at the temperatures for which such a device would be designed. The metallic oxide insulation 20 will allow molten metal to flow between the closely situated active leg 12 and length of wire 11.

The device can be formed in the manner used by fabrication of conventional metal sheath cable. The insulation and conductive elements are first arranged within a length of tubing and subsequently swaged to the desired final outside diameter.

When this device is formed as an insulated metal sheathed cable using normal manufacturing techniques, extrusion of the cable elements will assure that the inner insulating material will be more highly compressed adjacent the sheath than at its center. Thus, by locating the active leg 12 of the wire loop and the length of wire 11 near the center of the cable, one can assure that there will be less resistance to molten metal flow between them than in the mass of insulation located in the insulation between leg 12 and either the surrounding metal sheath itself or the return leg 13 of the loop of wire. According to this disclosure, this difference in compression of the insulating material plus the spatial separation between the conductor elements assures that shorting will occur between the desired conductive members 12 and 11.

The active electrical conductors in this device must be relatively close to one another. They should preferably be no more than 1/16" apart so as to assure proper metal flow for shorting purposes. In a typical device, the total outside diameter of the metal sheath 10 will be less than ¼".

Melting of the material in the conductors 12 and shorting of the conductor 11 will result at any location at which the preselected melting temperature of conductor 12 is reached. The short can be located along the length of the sensor by measurement of the resistance across terminals 16 and 19. The measured resistance will be a function of the lead length of sheath 10 from end 15 to end 14 plus the lead length of wire 11 from the closed end 14 of the sheath to the location of the short plus the lead length of the active leg 12 of the wire loop from the short location back through the return leg 13 to the terminal at 19.

Should a meltdown occur subsequently at a second point, the resistance measurement across terminals 16 and 19 might not change and it is then necessary to measure resistance along a second lead length. This could be from terminals 19 to 17 or from terminals 18 to 17, depending upon which path provides highest resistivity readings. By using this technique, one can always obtain the upper and lower bounds of the temperature profile and thereby establish the limits of the meltdown or other condition being monitored.

If a meltdown occurs at a single location along the device and grows longitudinally from there, plotting of resistivity as a function of time would clearly define such growth. If the meltdown occurs at two or more specific sites and then grows between these locations, more delicate differential resistance values would have to be plotted to accurately determine meltdown profile. The accuracy of such readings would depend greatly upon the inherent resistivity of the conductors. However, when this sensor design is applied to very high melt temperatures, the materials capable of surviving such temperatures also have very high resistivity. Examples of high temperature materials contemplated by this disclosure are molybdenum and tungsten.

If desired, one can increase the number of leads within the sheathed cable and increase the number of meltable leads as well. By using different melt temperatures in various leads, one can establish a core profile over a wide temperature range.

The system of temperature profile detection is irreversible in that one of the wires is melted during temperature detection. However, the metal sheathed cable can be readily replaced without affecting any adjacent equipment.

The device is fully enclosed and can be coated with protective materials when required. It cannot contaminate the surrounding environment and is exceptionally simple in that it does not involve any moving parts nor does it require any spatial clearance to surrounding elements.

Having described my invention, I claim:

1. A temperature profile detector comprising:
   a tubular sheath having a first closed end and a second end, said sheath surrounding a single loop of electrically conductive wire including an active leg and a return leg each leading to the second end of the sheath, said active leg serving as a first elongated electrical conductor;
   said sheath further surrounding a single length of electrically conductive wire connected to its closed end and serving as a second electrical elongated conductor parallel to said first conductor and spaced from it by the minimum distance required to normally maintain an open circuit between them;
   said first electrical conductor being made of material having a preselected melting point and said second electrical conductor being made of material whose melting point is appreciably above said preselected melting point;
   and confining insulating means surrounding said first and second electrical conductors for allowing molten metal from the first conductor to bridge the separation between the first and second electrical conductors after the attainment of a temperature equal to the melting point of the first electrical conductor at a location along its length.

2. A temperature profile detector as claimed in claim 1 comprising a length of metallic oxide insulated metal sheathed cable.

3. A temperature profile detector as claimed in claim 1 comprising a length of magnesium oxide or aluminum oxide insulated metal sheathed cable.

4. A temperature profile detector as claimed in claim 3 wherein the sheath, the length of electrically conductive wire and the return leg of the loop are made of tungsten or molybdenum.

5. A temperature profile detector as claimed in claim 1 wherein the spacing between the active leg of the loop and the length of wire is substantially less than the spacing between either of them and the sheath or loop return leg.

* * * * *